US012707237B2

(12) United States Patent
Laakkonen et al.

(10) Patent No.: US 12,707,237 B2
(45) Date of Patent: Aug. 11, 2026

(54) WIRELESS SENSOR NETWORK SYSTEM, AND DEVICE AND METHOD THEREOF

(71) Applicant: SENSIRE OY, Joensuu (FI)

(72) Inventors: Ossi Laakkonen, Joensuu (FI); Aki Hännikäinen, Joensuu (FI); Antti Tolonen, Joensuu (FI)

(73) Assignee: SENSIRE OY, Joensuu (FI)

( * ) Notice: Subject to any disclaimer, the term of this patent is extended or adjusted under 35 U.S.C. 154(b) by 0 days.

(21) Appl. No.: 17/779,993

(22) PCT Filed: Nov. 26, 2020

(86) PCT No.: PCT/FI2020/050799
§ 371 (c)(1),
(2) Date: May 25, 2022

(87) PCT Pub. No.: WO2021/105565
PCT Pub. Date: Jun. 3, 2021

(65) Prior Publication Data

US 2023/0009721 A1 Jan. 12, 2023

(30) Foreign Application Priority Data

Nov. 26, 2019 (FI) ..................................... 20196018

(51) Int. Cl.
*H04W 4/38* (2018.01)
*H04W 4/35* (2018.01)
(Continued)

(52) U.S. Cl.
CPC ............... *H04W 4/38* (2018.02); *H04W 4/35* (2018.02); *H04W 4/80* (2018.02); *H04W 84/12* (2013.01)

(58) Field of Classification Search
CPC .................................. H04W 4/38; H04W 4/80
See application file for complete search history.

(56) References Cited

U.S. PATENT DOCUMENTS

2008/0094209 A1 4/2008 Braun
2009/0248244 A1* 10/2009 Sumimoto ......... B60H 1/00735 701/36
(Continued)

FOREIGN PATENT DOCUMENTS

EP 1 895 456 3/2008

OTHER PUBLICATIONS

International Search Report for PCT/FI2020/050799 dated Feb. 15, 2021, 4 pages.
(Continued)

*Primary Examiner* — Wen W Huang
(74) *Attorney, Agent, or Firm* — NIXON & VANDERHYE

(57) ABSTRACT

An arrangement suitable for a mobile local wireless network includes: a gateway to facilitate a local short-range wireless network, to receive at least sensor measurement data via the short-range wireless network, and to be connected to an in-situ computing device; a computing device connected to the gateway, having a unit to obtain sensor measurement data via the gateway from sensor nodes; a sensor node transmitting measurement data via long-range wireless networks, and transmitting measurement data and receiving beacon signals via short-range communication. The gateway sends beacon signals. The sensor node receives a beacon signal and utilizes only the short-range wireless network for sending the measurement data, terminating transmission of data over long-range wireless networks for a period of time, in accordance with commands received from the gateway or as long as a beacon signal is detected at the sensor nodes. Corresponding gateway, method and computer-program product are also disclosed.

20 Claims, 3 Drawing Sheets

Figure 1:
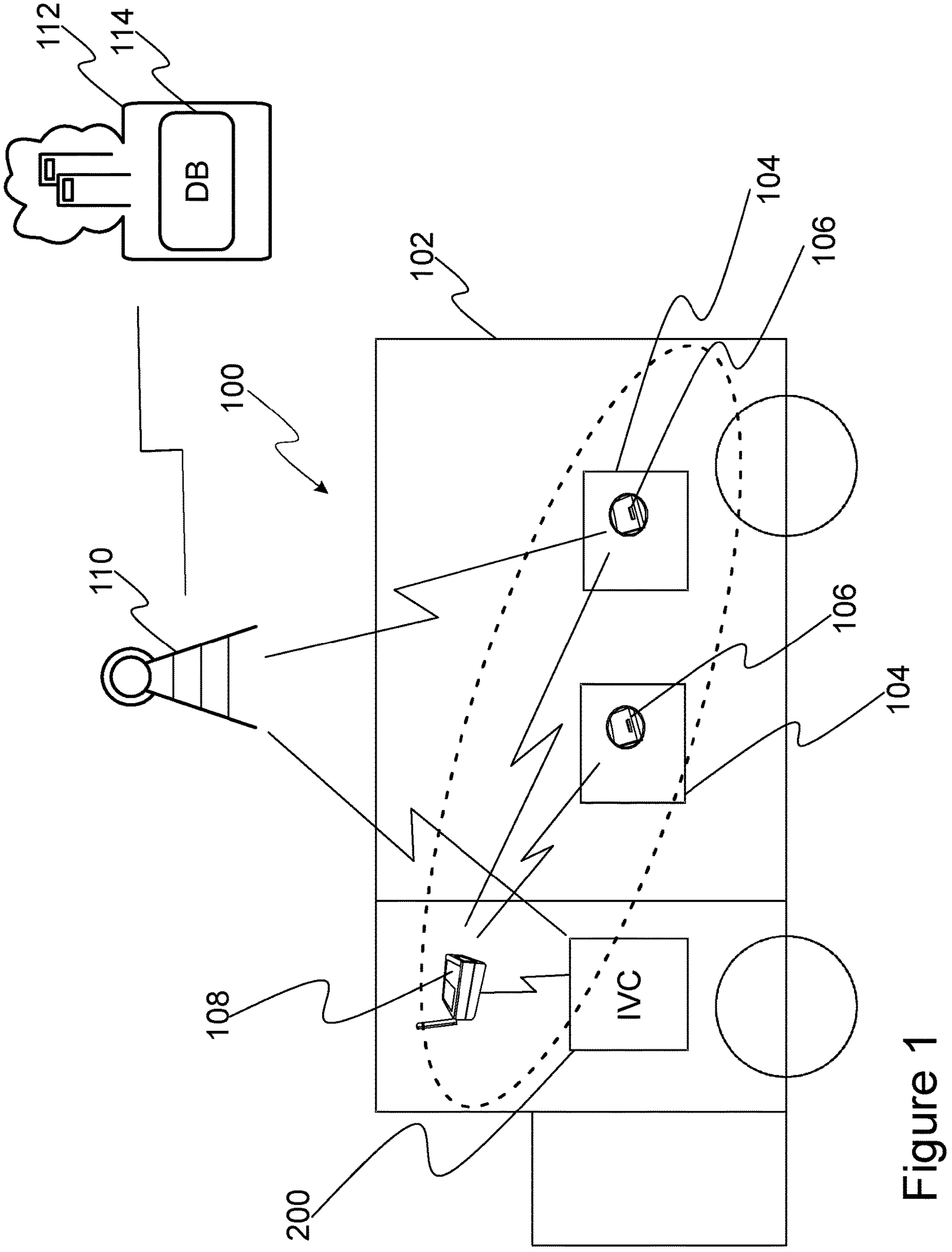

(51) Int. Cl.
*H04W 4/80* (2018.01)
*H04W 84/12* (2009.01)

(56) References Cited

U.S. PATENT DOCUMENTS

2010/0091715 A1* 4/2010 Akchurin ................ H04W 4/20 370/329
2014/0106677 A1* 4/2014 Altman ................... H04W 4/80 455/552.1
2014/0274031 A1* 9/2014 Menendez ............ H04W 4/029 455/552.1
2015/0245280 A1* 8/2015 Zhou ..................... H04W 36/32 455/434
2015/0281890 A1* 10/2015 Chen ....................... H04W 4/80 455/456.1
2016/0021433 A1* 1/2016 Mani ................. H04W 52/0209 340/870.07
2016/0156673 A1* 6/2016 Emmanuel .............. H04W 4/38 370/338
2016/0227351 A1* 8/2016 Gu ........................... H04B 1/44
2016/0325680 A1* 11/2016 Curtis ................... H04W 4/024
2016/0353492 A1 12/2016 Park et al.
2016/0379165 A1 12/2016 Moakley
2017/0208540 A1* 7/2017 Egner ................. H04W 64/003
2018/0332486 A1* 11/2018 Arab ................. H04W 52/0219
2019/0272496 A1 9/2019 Moeller

OTHER PUBLICATIONS

Written Opinion of the ISA for PCT/FI2020/050799 dated Feb. 15, 2021, 9 pages.
Office Action issued in Finnish Patent Application No. 20196018, dated Nov. 2, 2022.
Anonymous, “Beacon frame—Wikipedia”, Nov. 16, 2019 (Nov. 16, 2019), pp. 1-3, XP093254683, Retrieved from the Internet: URL: https://en.wikipedia.org/w/index.php?title=Beacon_frame&oldid=926442146.
Office Action, issued in European Patent Application No. 20819805.1 dated Mar. 4, 2025.

* cited by examiner

WIRELESS SENSOR NETWORK SYSTEM, AND DEVICE AND METHOD THEREOF

This application is the U.S. national phase of International Application No. PCT/FI2020/050799 filed Nov. 26, 2020 which designated the U.S. and claims priority to FI 20196018 filed Nov. 26, 2019, the entire contents of each of which are hereby incorporated by reference.

FIELD OF THE INVENTION

Generally, the present invention relates to electronic devices and short-range sensor network arrangements. Particularly, however not exclusively, the invention pertains to local sensor network arrangement in a mobile vehicle and a method thereof.

BACKGROUND

Remote monitoring of cargo units, such as parcels and containers, is an essential part of modern tracking of intermodal transportation means. Being able to monitor the cargo units in vehicles in sufficiently real-time is essential for managing the whole supply chain in an intelligent and preemptive manner. Commonly, prior art solutions relating to cargo monitoring utilize either lowpower wide-area network (LPWAN) communications IoT sensor nodes, which rely on the coverage of the chosen LPWAN technology, or short-range communications tags and sensor nodes, which in turn usually have very little capability for real-time monitoring. However, transporting cargo has the challenge of changing availability of network coverage as the vehicle transporting the cargo travels across different land, sea and urban environments, and further even has changing coverage inside different parts of the vehicle itself.

SUMMARY OF THE INVENTION

The objective of the embodiments of the present invention is to at least alleviate one or more of the aforementioned drawbacks evident in the prior art arrangements particularly in the context of moving local sensor network arrangement and methods. The objective is generally achieved with an arrangement, device and method as disclosed and claimed.

The present solution offers an arrangement wherein mobile sensor nodes may send measurement data continuously and wirelessly by switching transmissions between long-range wireless network, such as LPWAN and cellular network, and short-range sensor network usage.

In accordance with one aspect of the present invention an arrangement suitable for a mobile local wireless network, comprising

- a gateway having means to
  - facilitate a local short-range wireless network,
  - receive at least sensor measurement data via the short-range wireless network, and
  - connect to an in-situ computing device,
- a computing device connected to the gateway, the computing device comprising means to obtain sensor measurement data via the gateway from one or more sensor nodes,
- at least one sensor node arranged to transmit measurement data via long-range wireless networks, and to transmit measurement data and to receive at least beacon signals via short-range communication means,
- wherein the gateway is arranged to send beacon signals, and wherein the at least one sensor node at receival of a beacon signal is arranged to utilize only the short-range wireless network for sending the measurement data and terminate transmission of data over long-range wireless networks for a period of time, in accordance with commands received from the gateway or as long as a beacon signal is detected at the sensor nodes.

According to an exemplary embodiment of the present invention the gateway is connected to the computing device via short-range wireless communication means, or by wired connection means.

According to an exemplary embodiment of the present invention the arrangement of any preceding embodiment wherein the gateway is a dongle device connected to and essentially operated by the computing device.

According to an exemplary embodiment of the present invention the gateway is a mobile modem connected to and at least partly operated by the computing means.

According to an exemplary embodiment of the present invention a sensor node is arranged to use long-range wireless networks if beacon signal is not detected at the sensor node for a period of time.

According to an exemplary embodiment of the present invention the computing device is a mobile device, computer terminal or in-vehicle computing device.

According to an exemplary embodiment of the present invention the computing device is arranged to communicate with an external server to send sensor measurement data to the external server.

According to an exemplary embodiment of the present invention the measurement data from the sensor nodes may be presented at the computing device to a user.

According to an exemplary embodiment of the present invention the measurement data from the sensor nodes may be used to form an alarm at the computing device to a user.

In accordance with one aspect of the present invention gateway usable for a mobile wireless network comprising

- means to facilitate a short-range wireless network,
- means to connect with a computing device,
- wherein the gateway is arranged to transmit beacon signals to provide sensor nodes a signal to transmit data only via the local short-range wireless network and to terminate transmission of data via long-range wireless networks for a period of time, in accordance with commands received from the gateway or as long as a beacon signal is detected at the sensor nodes, the gateway being further arranged to receive data from sensor nodes, and further transmit received sensor data to the computing device.

According to an exemplary embodiment of the present invention the gateway is further arranged to transmit data from the computing device to the sensor nodes.

According to an exemplary embodiment of the present invention the short-range wireless network comprises IEEE 802.11, IEEE 802.15.1 and/or ISM/SRD band communication network.

In accordance with one aspect of the present invention a method for a mobile local wireless network, comprising the steps of

- sending a beacon signal from a gateway to one or more sensor nodes,
- receiving beacon signal at a sensor node,
- at receival of beacon signal at the node terminating transmission of data using long-range wireless networks for a period of time, in accordance with commands received from the gateway or as long as a beacon signal is detected at the sensor nodes, and switching to transmit data via short-range network towards the gateway, sending data from the gateway to a connected computing device, providing data at or via the computing device.

In accordance with one aspect of the present invention a computer program product embodied in a non-transitory computer readable medium, comprising computer code for causing the computer to execute the method in accordance with the present invention.

As briefly reviewed hereinbefore, the utility of the different aspects of the present invention arises from a plurality of issues depending on each particular embodiment.

The expression "a number of" may herein refer to any positive integer 30 starting from one (1). The expression "a plurality of" may refer to any positive integer starting from two (2), respectively.

The term "exemplary" refers herein to an example or example-like feature, not the sole or only preferable option.

Different embodiments of the present invention are also disclosed.

BRIEF DESCRIPTION OF THE RELATED DRAWINGS

Figure 2:
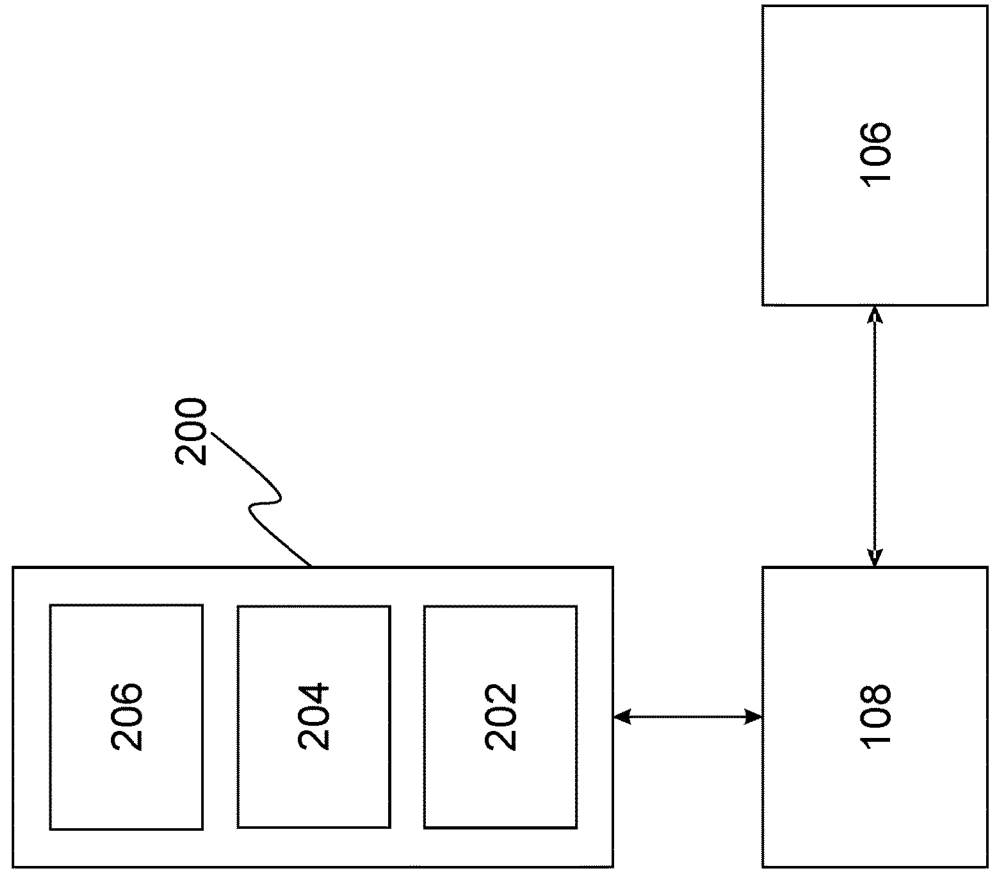
Figure 3:
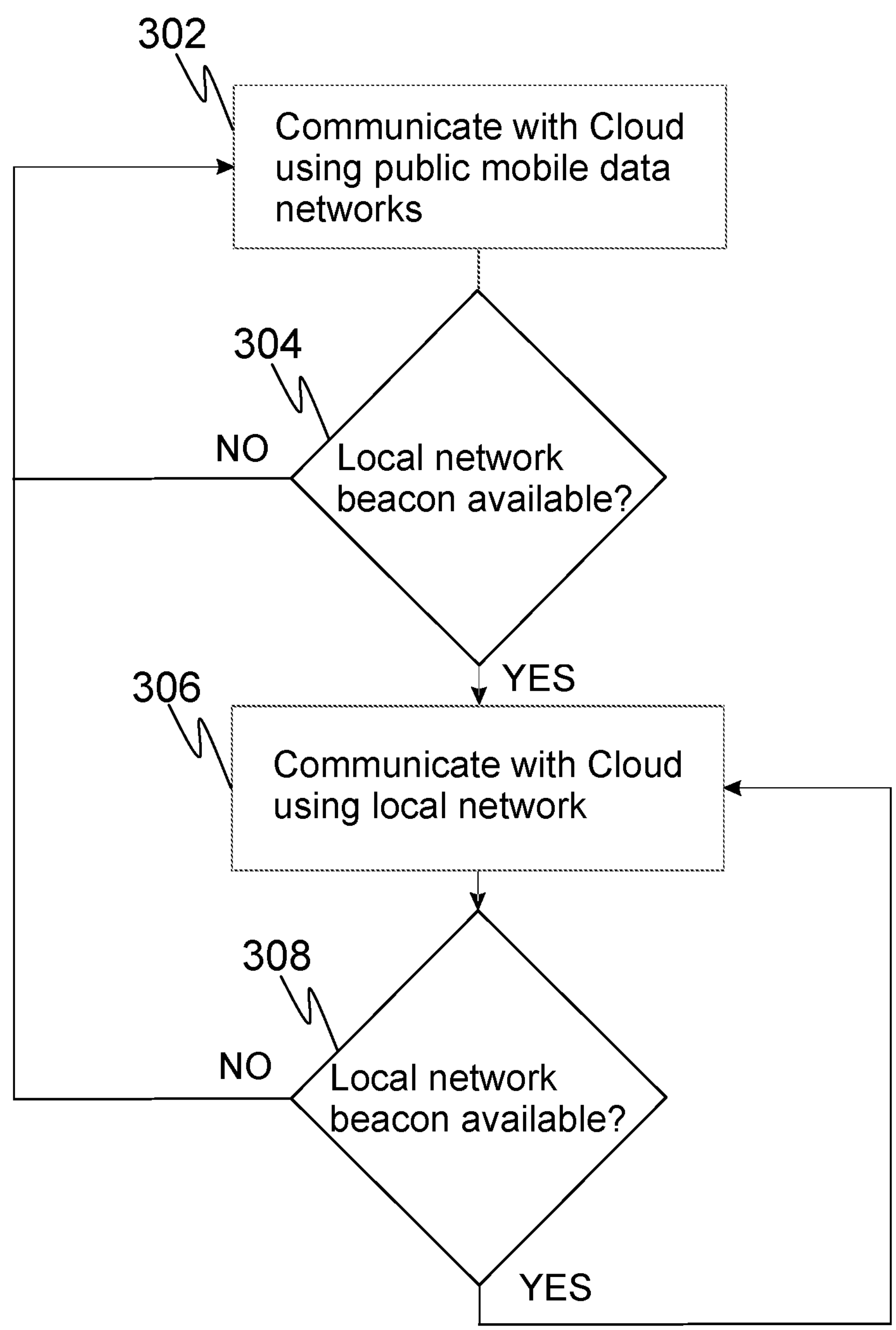

Next, some exemplary embodiments of the present invention are reviewed more closely with reference to the attached drawings, wherein FIG. 1 illustrates an arrangement and some associated aspects thereof in accordance with an embodiment of the present invention, FIG. 2 depicts a block diagram of the computing device, gateway and sensor node and some associated aspects thereof in accordance with an embodiment of the present invention, FIG. 3 illustrates a flow chart of a method in accordance with an embodiment of the present invention.

DETAILED DESCRIPTION OF THE EMBODIMENTS

FIG. 1 illustrates an arrangement (100) and some associated aspects thereof in accordance with an embodiment of the present invention.

The arrangement (100) comprises at least a gateway (108) and a number of sensor nodes (106), which sensor nodes (106) may transmit data over a number of long-range wireless communication networks (110) and a number of short-range communication networks. In this embodiment the gateway (108) is situated in a cab of the vehicle and the sensor nodes (106) are situated in the cargo space of the vehicle (102), such as being situated in cargo parcels (104), boxes and the like for monitoring a number of conditions of the cargo parcels, boxes and the like, and/or ambient conditions thereof.

The sensor nodes (106) may be arranged to send data over a number of long-range wireless communication networks (110), such as cellular data networks, Long Range (LoRa), or long-range Internet of Things (IoT) networks. The gateway (108) may be arranged to send beacon signals at preferred intervals, at particular geographical locations, in response to system command such as a command initialized automatically by the system software or in response to manual initiation by a user, or the beacon signal may be sent whenever a used long-range wireless communication network (110) coverage is weak or missing. The sensor nodes (106) are arranged receive beacon signals sent by the gateway (108) and switch to using short-range communication network established by the gateway (108). The long-range wireless communication transmission may be arranged to be terminated at a sensor node (106) in response to detection of a beacon signal at the sensor node (106).

The gateway (108) is connected to a computing device (200), such as a mobile device, computer terminal or in-vehicle computing device (200). Sensor measurement data from the sensor nodes (106) may be transmitted to a remote server (112) and measurement database (114) thereof for retuote monitoring of the cargo parcels (104) in the vehicle (102). Sensor measurement data may be also provided to the operator of the vehicle essentially real-time via the computing device (200). This way sensor measurement information pertaining to the cargo of the vehicle may be provided for remote monitoring and to the operator in real-time, which is beneficial e.g. in temperature-controlled cargo delivery and other such ambient conditions-controlled cargo deliveries.

Further, measurement data may be provided to a remote server (112) or cloud service wherein measurement information may be processed, stored, and provided for further use. The remote server (112) or cloud service may also facilitate alarms if discrepancies in conditions-control of a delivery is detected. This way, parcel-level monitoring is achieved with or without continuous sensor node-level IoT Network connection, which connection may be limited when a cargo vehicle with the sensor nodes moves through rural areas, underground facilities, etc. The remote server (112) or cloud service may be used to monitor real-time location of the parcels (104) and vehicle (102), real-time temperatures of parcels (104) and alarm status of the parcels (104) or the vehicle (102).

FIG. 2 depicts a block diagram of the computing device (200), gateway (108) and sensor node (106) and some associated aspects thereof in accordance with an embodiment of the present invention.

The computing device (200) comprises at least a communications interface (202) for connecting the gateway (108) and the computing device (200). The communication interface (202) may be wireless or wired, such as a USB (Universal Serial Bus) connection, or other such preferred communication interface to provide sensor measurement data to an external server or to a number of users via the computing device (200).

The computing device (200) further comprises a computing unit (204), with processing means and memory for preprocessing and/or storing sensor measurement information. The computing device (200) may also comprise a software component (206) for providing a user measurement information in view of the collected measurement data from the sensor nodes and/or for generating alerts for a user pertaining the measurement data. Further the software component (206) may comprise functions to link sensor nodes to the transport and/or setting up temperature limits for the transport. The functions of the software component (206) may carried out at the external server to, which the computing device (200) is connect-ed to or the functions may be at least partly carried out on the computing device (200).

The computing device (200) further comprises long-range wireless communication means (110) to form an uplink via NB-IoT, LTE Cat-M1 and 2G/3G/4G/5G communication techniques for at least sending measurement data to an external server or cloud system. When needed, the gateway (108) may also comprise a card SIM or a chip/software-based E-SIM for Long-range communications via cellular means. Optionally, the computing device (200) may comprise short-range wireless communication means for at least connecting with the gateway (108) wirelessly.

The computing device (200) may comprise or constitute mobile device, such as a mobile phone, tablet, computer terminal, such as a laptop, or an in-vehicle device, such as an in-vehicle terminal unit integrated to the vehicle (102).

The gateway (108) may be connected to an in-situ communication means meaning a computing device (200) sufficiently close to the gateway (108), such as a user mobile computing device or in-vehicle computing device, via a USB, Ethernet, Modbus or RS485 or other preferred communication bus, or wireless interface, to provide sensor measurement data to an external server or to a number of users e.g. via a user mobile device.

The gateway (108) comprises an RF-interface with at least wireless short-range transmission means and receiving means, such as IEEE 802.11, IEEE 802.15.1 and/or such ISM/SRD/proprietary band communication means for receiving measurement data from a sensor node (106), sending beacon signals and also for receiving sensor measurement data from the sensor node (106). For example, a beacon signal may be sent with 1 signal per second interval but it is clear to a person skilled in the art that the transmission interval and such schemes for transmitting beacon signals and consequently facilitating short-range networking be selected arbitrarily as preferred. The establishment of short-range communications between the gateway (108) and the sensor nodes (106) may be activated automati-cally e.g. in response to a particular location or geo-fencing information, or in response to weak long-range wireless communications coverage, or in response to user or system command at the computing device (200) or at the remote server (112).

The gateway (108) may also comprise long-range wireless communication means (110) to form an uplink via NB-IoT, LTE Cat-M1 and 2G/3G/4G/5G communication techniques. When needed, the gateway (108) may also comprise a card SIM or a chip/software-based E-SIM for long-range communications via cellular means.

The gateway (108) preferably comprises or constitutes a dongle device connected to and essentially operated by the computing device (200). The gateway may comprise a mobile modem connected to and at least partly operated by the computing means. Alternatively, the gateway (108) may comprise or constitute a standalone device, with networking and processing capabilities. Alternatively, the gateway (108) may comprise or constitute a software component at the computing device (200), wherein the gateway (108) hardware aspects, such as data transfer means and processing means are facilitated by the computing device (200).

The sensor node (106) comprises at least an RF transmitter, receiver and/or transceiver arranged to at least receive beacon signals from the gateway (108) and to transmit signals to the gateway (108) via short-range communications means. The RF transmitter, receiver and/or transceiver may comprise one or more circuits and components pertaining to RFID, NFC, IEEE 802.11 a/b/g/n, IEEE 802.15.1, IEEE 802.15.4 and/or such ISM/SRD/proprietary band communication techniques. The sensor node (106) RF receiver and/or transceiver is preferably essentially constantly on so or on in accordance with a predetermined scheme so that the presence of a gateway (108) may be detected via the receival of one or more beacon signals from the gateway (108).

The sensor nodes (106) may comprise also long-range wireless communication means for transmitting data to and/or receiving data from an external server or cloud system. The long-range transmission means may comprise a radio for establishing communication using cellular data networks, Long Range (LoRa) networks, or long-range Internet of Things (IoT) networks. The sensor nodes (106) may comprise also other essential components or circuits such as a memory for at least for collecting sensor measurement data.

A sensor node (106) may comprise one or more sensing means such as a number of temperature sensors, humidity sensors, magnetic sensors, accelerometers, pressure sensors, and gyroscope. These sensors may be used to detect pressure, temperature, humidity, changes in velocity and rotation of the cargo units (104), which may be further used to determine and monitor the conditions of the cargo that is transported. Clearly, other such sensing means for detecting events or changes in the ambient or internal conditions of the sensor node may be also utilized.

FIG. 3 illustrates a flow chart of a method in accordance with an embodiment of the present invention.

At 302, sensor nodes in a vehicle, such as sensor nodes for monitoring cargo units, communicate with an external server such as a cloud server or cloud server using public long-range wireless communications networks. The sensor nodes may send at least sensory monitoring data pertaining to parcels in which the sensor nodes are placed for tracking a number of conditions of the parcel during transport.

At 304, a sensor node listens to local short-range wireless network availability, which is detected by a beacon signal sent by a gateway. The gateway may be arranged to send a beacon signal to one or more sensor nodes, in response to user command or in response to a long-range wireless communications condition, such as coverage, mies or costs of using long-range wireless communications network. After initiation of establishing a short-range wireless network a beacon signal may be sent e.g. with 1/sec interval to the one or more sensor nodes.

At 306, a beacon signal is detected at a node. When beacon signal is detected at a node, the node changes to transmit data over the detected local short-range wireless network. The local network is used as long as it is available. Consequently, the measurement data from the sensor nodes is relayed to an external server or cloud via the local network gateway.

Further, measurement data from the sensor nodes may be provided locally at a computing device connected to gateway and arranged to collect measurement data via the wireless short-range network from the sensor nodes. Even further, the sensor nodes which connect to the short-range wireless network may be determined at the computing device or at a remote server to be sensor nodes in the particular vehicle and transport. Even further, alarms may be produced to the operator of the vehicle or to a remote serv-er, wherein such alarms may be targeted to the whole vehicle or pinpointed to a specific parcel.

At 308, a node listens to local network availability. If the beacon signal is detected, the node continues to transmit data over the detected local network. If a beacon signal is not detected or not detected for a period of time the node changes to transmit using public mobile data networks. The node may continue listening to beacon signals.

The scope of the invention is determined by the attached claims together with the equivalents thereof. The skilled persons will again appreciate the fact that the disclosed embodiments were constructed for illustrative pur-poses only, and the innovative fulcrum reviewed herein will cover further embodiments, embodiment combinations, variations and equivalents that better suit each particular use case of the invention.

The invention claimed is:

1. An arrangement suitable for a mobile local wireless network, the arrangement comprising:

at least one sensor node configured to transmit sensor measurement data via at least one long-range wireless network, and to transmit the sensor measurement data and to receive at least beacon signals via short-range communication; and a gateway configured to facilitate a local short-range wireless network, receive at least the sensor measurement data via the short-range wireless network, connect to an in-situ computing device, comprising one or more processors configured to obtain the sensor measurement data via the gateway from the at least one sensor node, the in-situ computing device being configured as a user-operated device, and send beacon signals in response to a manual initiation by a user or when a coverage of the at least one long-range wireless communication network that is currently-used is weak or missing, wherein, at receival of one of the beacon signals at the at least one sensor node, the at least one sensor node switches to using only the short-range wireless communication network to send the measurement data and terminates using the at least one long-range wireless communication network to transmit data, in accordance with commands received from the gateway or as long as a beacon signal is detected at the at least one sensor node.

2. The arrangement of claim 1, wherein the gateway is connected to the computing device via a short-range wireless communication system, or by a wired connection.

3. The arrangement of claim 2, wherein the gateway is a dongle device connected to and essentially operated by the computing device.

4. The arrangement of claim 2, wherein the gateway is a mobile modem connected to and at least partly operated by the computing device.

5. The arrangement of claim 2, wherein the at least one sensor node is configured to use long-range wireless networks when a beacon signal is not detected at the sensor node for a period of time.

6. The arrangement of claim 1, wherein the gateway is a dongle device connected to and essentially operated by the in-situ computing device.

7. The arrangement of claim 6, wherein the gateway is a mobile modem connected to and at least partly operated by the computing device.

8. The arrangement of claim 6, wherein the at least one sensor node is configured to use long-range wireless networks when a beacon signal is not detected at the sensor node for a period of time.

9. The arrangement of claim 1, wherein the gateway is a mobile modem connected to and at least partly operated by the in-situ computing device.

10. The arrangement of claim 9, wherein the at least one sensor node is configured to use long-range wireless networks when a beacon signal is not detected at the sensor node for a period of time.

11. The arrangement of claim 1, wherein the at least one sensor node is configured to use long-range wireless networks when a beacon signal is not detected at the sensor node for a period of time.

12. The arrangement of claim 1, wherein the computing device is a mobile device, a computer terminal, or an in-vehicle computing device.

13. The arrangement of claim 1, wherein the computing device is configured to communicate with an external server to send sensor measurement data to the external server.

14. The arrangement of claim 1, wherein the measurement data from the sensor nodes is presented at the computing device to a user.

15. The arrangement of claim 1, wherein the measurement data from the sensor nodes is used to form an alarm at the computing device to a user.

16. A gateway usable for a mobile wireless network, the gateway comprising:

one or more processors configured to:

facilitate a short-range wireless network, and connect with a computing device configured as a user-operated device, wherein the gateway is configured to transmit beacon signals in response to a manual initiation by a user or when a coverage of the at least one long-range wireless communication network that is currently-used is weak or missing, to provide sensor nodes with a signal to cause the respective sensor nodes to switch to transmitting data using only the local short-range wireless network and to terminate using long-range wireless networks to transmit data, in accordance with commands received from the gateway or as long as a beacon signal is detected at the sensor nodes, the gateway being further configured to receive data from the sensor nodes, and transmit received sensor data to the computing device.

17. The gateway of claim 16, wherein the gateway is further configured to transmit data from the computing device to the sensor nodes.

18. The gateway of claim 16, wherein the short-range wireless network comprises one or more of IEEE 802.11, IEEE 802.15.1, and ISM/SRD band wireless communication network.

19. A method for a mobile local wireless network, the method comprising:

sending at least one beacon signal from a gateway to one or more sensor nodes in response to a manual initiation by a user or when a coverage of at least one long-range wireless communication network that is currently-used is weak or missing;

receiving one of the at least one beacon signal at one of the sensor nodes;

at receival of the one beacon signal at the one sensor node, switching, by the one sensor node, to using only a short-range wireless communication network to send measurement data and terminate using the at least one long-range wireless communication network to transmit data, in accordance with commands received from the gateway or as long as a beacon signal is detected at the one sensor node;

sending the measurement data from the gateway to a connected computing device configured as a user-operated device; and providing the measurement data at or via the connected computing device.

20. A non-transitory computer readable medium, comprising computer code that, when executed by a computer, causes the computer to execute the method of claim 19.

* * * * *